Dec. 15, 1959      J. F. FLODIN      2,917,170
CONVEYING AND SIZING MACHINE
Filed May 11, 1956      3 Sheets-Sheet 1

John F. Flodin
INVENTOR.

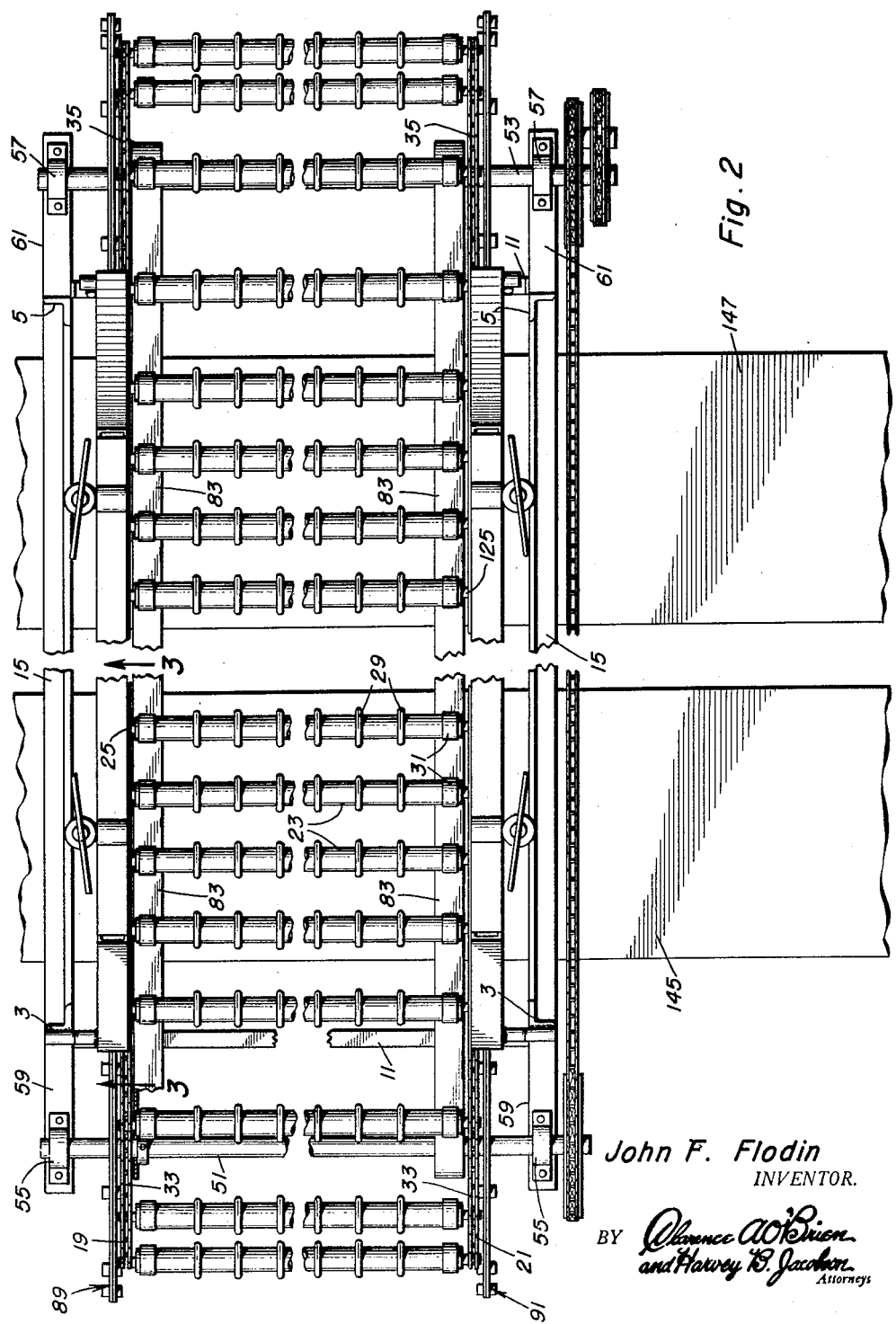

Dec. 15, 1959  J. F. FLODIN  2,917,170
CONVEYING AND SIZING MACHINE
Filed May 11, 1956  3 Sheets-Sheet 3
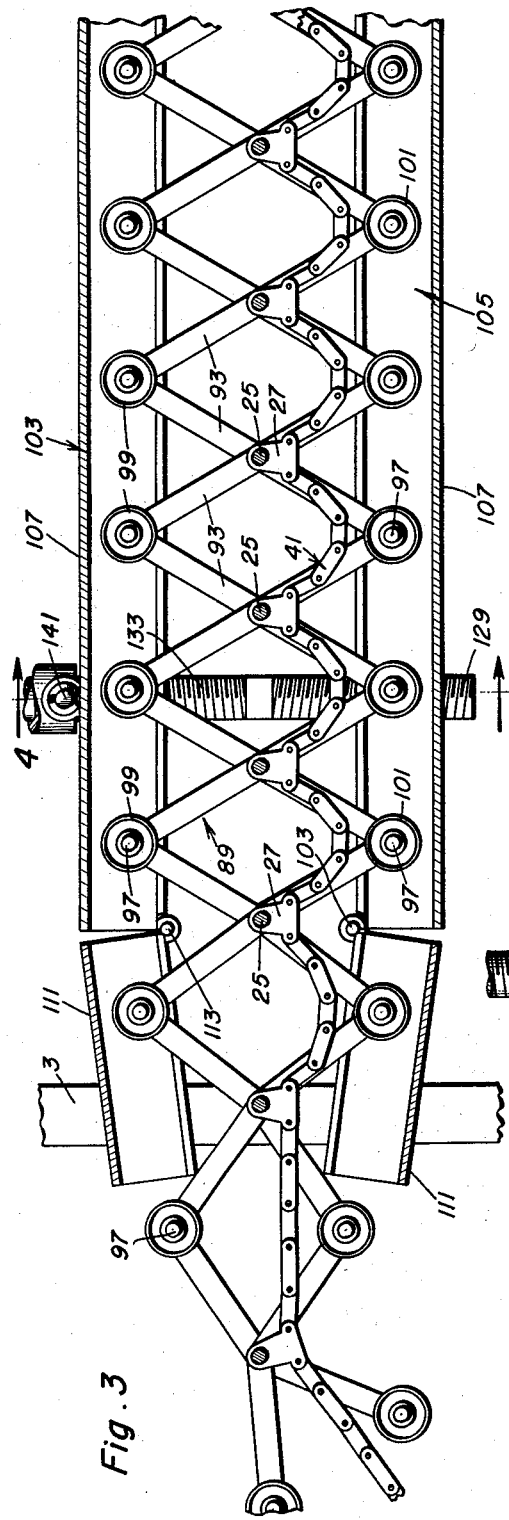
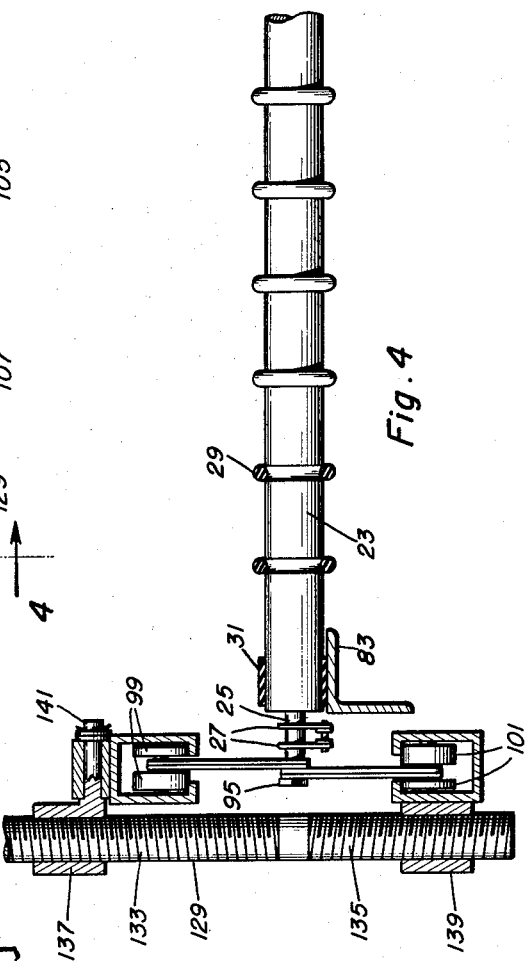
John F. Flodin
INVENTOR.
BY
Attorneys

United States Patent Office 2,917,170
Patented Dec. 15, 1959

2,917,170

CONVEYING AND SIZING MACHINE

John F. Flodin, Grandview, Wash., assignor of one-third to Allan Flodin and one-third to Frank Flodin, both of Sunnyside, Wash.

Application May 11, 1956, Serial No. 584,244

5 Claims. (Cl. 209—106)

My invention relates to improvements in machines for conveying and sizing farm produce such as potatoes, tomatoes, onions, apples and the like.

The primary object of my invention is to provide in a machine having a roller type endless conveyor automatic means for variably spacing the conveyor rollers apart to size produce as it is being conveyed.

Another object is to provide means connecting the conveyor rollers and expansible and contractible to variably space the conveyor rollers apart.

Still another object is to provide roller and roller guide means for expanding and contracting the expansible and contractible means.

Yet another object is to provide means for variably spacing the conveyor rollers apart while connected to side conveyor chains.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a view in plan partly broken away of the same;

Figure 3 is an enlarged fragmentary view in vertical section taken on the line 3—3 of Figure 2, and Figure 4 is a fragmentary view in vertical cross section taken on the line 4—4 of Figure 3.

Figure 1:
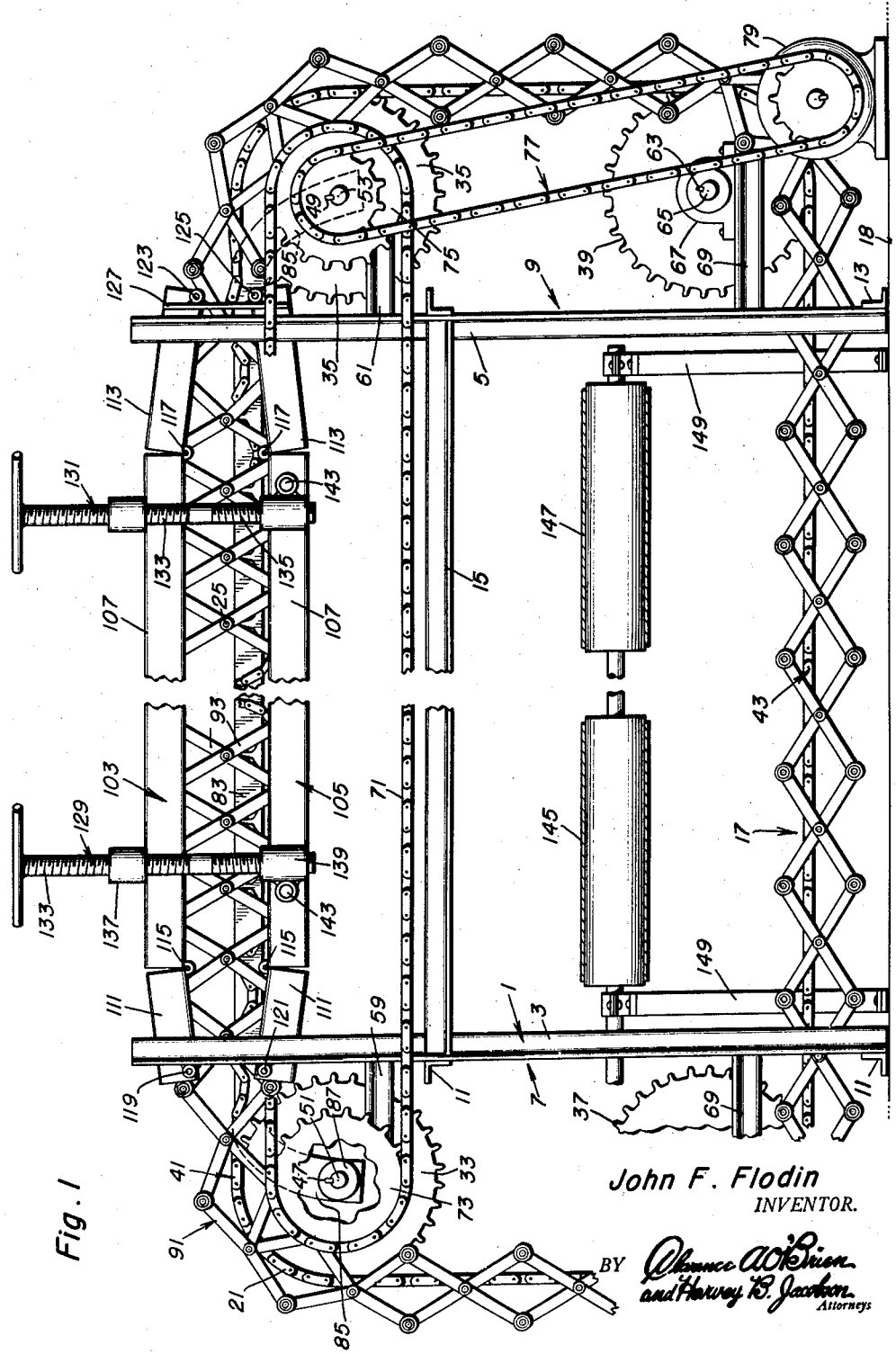
Figure 1 is a view in side elevation partly broken away of my improved conveying and sizing machine in a preferred embodiment thereof.

Referring to the drawings by numerals, the conveying and sizing mechanism of my invention comprises a substantially rectangular angle bar frame, designated generally by the numeral 1 and including pairs of corner posts 3, 5 at front and rear ends 7, 9 of the frame 1 cross connected by suitably arranged transverse bars 11, 13 and by longitudinal side bars as at 15. The frame may be a welded together structure.

An endless conveyor designated generally by the numeral 17, runs horizontally through the upper portion of the frame 1 longitudinally of said frame 1 between the posts 3, 5 of the pairs and in a vertical plane and comprises a pair of side sprocket chains 19, 21 at opposite sides of the frame 1, and transverse conveyor rollers 23 having end trunnions 25 journaled in pairs of opposite bearing plates 27 forming links of the side chains 19, 21 and spacing the conveyor rollers 23 apart equidistantly normally. The chains 19, 21 have a certain amount of slack thereon as shown in Figure 3.

The conveyor rollers 23 are provided with resilient rings 29 fixed therein and spaced equidistantly along the same to maintain farm produce thereon and are also provided on the ends thereof with resilient flat bands 31 for running on and frictionally gripping track bars presently described.

The side chains 19, 21 are trained over upper pairs of sprocket wheels 33, 35 at the front and rear ends 7, 9 of the frame 1 and under lower pairs of sprocket wheels 37, 39 whereby the conveyor 7 is arranged in a vertical loop with an upper run 41 traveling horizontally through the upper portion of the frame 1 and a lower run 43 traveling through the lower portion of said frame and said chains 19, 21 are provided with slack thereon for a purpose presently seen.

The upper pairs of sprocket wheels 33, 35 are keyed, as at 47, 49 on cross shafts 51, 53 journaled in bearings 55, 57 on horizontal bracket arms 59, 61 extending outwardly and suitably fixed to the end bars 3, 5 and whereby the upper pairs of sprocket wheels 33, 35 are spaced outwardly of the front and rear ends 7, 9 of the frame 1 to correspondingly space the upper run 41.

The lower pair of sprocket wheels 37, 39 are keyed as at 63 on cross shafts one of which is shown at 65 which are journaled in bearings, as at 67, on bracket arms as at 69 whereby said sprocket wheels 37, 39 are also spaced outwardly of the front and rear ends 7, 9 of the frame 1.

The conveyor 17 is driven counter-clockwise as viewed in Figure 1 by means of the upper pair of sprocket wheels 33, 35, a horizontal sprocket chain 71 trained around sprocket wheels 73, 75 fast on the shafts 51, 53 and whereby the shaft 53 is operatively connected to the shaft 51, and a sprocket and chain drive 77 from an electric motor 79 to the shaft 53. The motor 79 may be located in any suitable position as on the base 81 from which the frame 1 rises.

A pair of inverted angle iron track bars 83 extend horizontally through the upper portion of the frame 1 at opposite sides thereof and on which the bands 31 roll to support the conveyor rollers 23 at the ends thereof for supporting the upper run 41 of the conveyor 17 and to impart rotation to said rollers 23. The track bars 83 may be fixed in the frame 1 in any suitable manner, for instance, by downturned ends 85 through which the shafts 51, 53 are journaled with collars, as at 87 thereon between which said ends 85 are interposed.

Means for variably spacing the conveyor rollers 23 apart in the upper run 41 of the conveyor 17 to size the produce comprises the following. A pair of endless lazy tong chains 89, 91 are carried by the side sprocket chains 19, 21 and extend along said chains outwardly thereof. The lazy tong chains each comprise pairs of vertical links 93 pivoted together in crossed relation by the beforementioned trunnions 25 carrying link retaining nuts 95 thereon and the links 93 of each pair are terminally pivoted, as at 97, to adjacent pairs of links so that the lazy tong chains 89, 91 are expansible and contractible in a vertical plane to variably space the conveyor rollers 23 apart.

For contracting the lazy tong chains 91, 93 vertically spaced series of rollers 99, 101 are provided in pairs on the terminal pivots 97, of the links 93 at opposite sides of the chains 89, 91. Pairs of vertically spaced, channel guides 103, 105 of bifurcated shape in cross section in which the rollers 99, 101 run and are supported are provided in the frame 1 at opposite sides thereof to extend substantially horizontally in each pair above and below the upper run 41 of the conveyor 17.

The guides 103, 105 each comprise an intermediate section 107, interposed endwise between the inner ends of a pair of relatively shorter front and rear end sections 111, 113 at the front and rear ends 7, 9 of the frame 1. The intermediate sections 107 are hinged at their ends as at 115, 117 to the inner ends of the front and rear end sections 111, 113 for vertical swinging thereon, the front end sections 111, 113 are hinged at outer ends thereof as at 119, 121 to the front posts 3 to swing vertically thereon, and the rear end sections 113 are at outer ends thereof, as at 123, 125 to a vertical cross connecting floating bar 127 with which said sections 113 float.

The arrangement of the guides 103, 105 described in the preceding paragraph provides for adjusting the intermediate sections 107 into variably spaced parallel relation in the pairs of guides 103, 105, or into rearwardly diverging relation in said pairs, the rear end sections 113 floating to compensate for swinging of the sections 107, 111, 113 relatively.

For adjusting the sections 107, vertical hand screws 129, 131 are provided at the ends thereof with right and left hand threads 133, 135 threaded through upper and lower bushings 137, 139 pivoted as at 141, 143 on said sections 107.

As will now be seen, when the intermediate sections 107 of the guides 103, 105 are adjusted parallel, the upper and lower series of rollers 99, 101 are adjusted toward or from each other to contract or expand the lazy tong chains 89, 91 at the upper run of the conveyor 17 uniformly so that the conveyor rollers 23 are equidistantly spaced apart at said run to permit produce of given sizes to fall between said rollers and be uniformly sized. On the other hand when the intermediate sections of guides 103, 105 are adjusted to diverge rearwardly, the series of rollers 99, 101 are adjusted to converge rearwardly at the run 41 whereby the lazy tong chains 89, 91 will be expanded progressively from front to rear of the run 41 thus spacing the conveyor rollers 23 progressively further apart from front to rear of the run 41. This provides for sizing produce of slightly varying sizes, the smaller sizes first and afterwards the larger varying sizes. As best shown in Figure 3 the side chains 19, 21 are provided with a sufficient amount of slack thereon to permit variable spacing of the conveyor rollers 23.

A pair of cross conveyors 145, 147 are suitably driven and mounted on standards 149 for receiving the sized produce below the upper run 41 of conveyor 17.

Any suitable means may be provided for feeding produce onto the conveyor 17 at the front end 7 of the frame 1.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a conveying and sizing machine for farm produce, a frame, an endless conveyor comprising a pair of side sprocket chains and spaced cross members connecting said chains, means mounting said conveyor in said frame for travel with a horizontal run adapted to convey produce thereon, means on said conveyor and means on said frame coacting for variably spacing said cross members apart in response to travel of the conveyor, whereby produce of different sizes may drop from said run between said cross members, said means on said conveyor comprising a pair of endless chains of lazy tongs on opposite sides of said conveyor pivotally connected to said cross members for expansion and contraction to variably space said cross members and having rollers thereon, and said means in said frame comprising channel guides mounted in said frame and in which said rollers run.

2. In a conveying and sizing machine for farm produce, a frame, an endless conveyor comprising a pair of side sprocket chains and spaced cross members connecting said chains, means mounting said conveyor in said frame for travel with a horizontal run adapted to convey produce thereon, means on said conveyor and means on said frame coacting for variably spacing said cross members apart in response to travel of the conveyor, whereby produce of different sizes may drop from said run between said cross members, said means on said conveyor comprising a pair of endless chains of lazy tongs pivotally connected to said cross members for expansion and contraction to variably space said cross members and having rollers thereon, and said means in said frame comprising channel guides mounted in said frame and in which said rollers run, said rollers being adjustable vertically to expand and contract said pair of lazy tong chains, said channel guides being adjustably mounted for adjusting said rollers.

3. In a conveying and sizing machine for farm produce, a frame, an endless conveyor comprising a pair of side sprocket chains and spaced cross members connecting said chains, means mounting said conveyor in said frame for travel with a horizontal run adapted to convey produce thereon, means on said conveyor and means on said frame coacting for variably spacing said cross members apart in response to travel of the conveyor, whereby produce of different sizes may drop from said run between said cross members comprising a pair of endless chains of lazy tongs on opposite sides of said conveyor pivotally connected to said cross members for expansion and contraction to variably space said cross members and having rollers thereon, and said means in said frame comprising channel guides mounted in said frame and in which said rollers run, said rollers being adjustable vertically to expand and contract said pair of lazy tong chains, said channel guides being adjustably mounted for adjusting said rollers, and screw feed means on said channel guides for adjusting said channel guides.

4. In a conveying and sizing machine for farm produce, a frame, an endless conveyor comprising a pair of side sprocket chains and spaced cross members connecting said chains, means mounting said conveyor in said frame for travel with a horizontal run adapted to convey produce thereon, means on said conveyor and means on said frame coacting for variably spacing said cross members apart in response to travel of the conveyor, whereby produce of different sizes may drop from said run between said cross members, said means on said conveyor comprising a pair of endless chains of lazy tongs on opposite sides of said conveyor pivotally connected to said cross members for expansion and contraction to variably space said cross members and having rollers thereon, and said means in said frame comprising channel guides mounted in said frame and in which said rollers run, said rollers being adjustable vertically to expand and contract said pair of lazy tong chains, said channel guides being adjustably mounted for adjusting said rollers, and screw feed means on said channel guides for adjusting said channel guides, said guides comprising pivoted end sections pivoted on said frame for angular adjustment to adjust said rollers in response to screw feed adjustment of said guides.

5. In a conveying and sizing machine for farm produce, a frame, an endless conveyor comprising a pair of side sprocket chains and spaced across members connecting said chains, means mounting said conveyor in said frame for travel with a horizontal run adapted to convey produce thereon, means on said conveyor and means on said frame coacting for variably spacing said cross members apart in response to travel of the conveyor, whereby produce of different sizes may drop from said run between said cross members, said means on said conveyor comprising a pair of endless chains of lazy tongs on opposite sides of said conveyor pivotally connected to said cross members for expansion and contraction to variably space said cross members and having rollers thereon, and said means in said frame comprising channel guides mounted in said frame and in which said rollers run, said rollers being adjustable vertically to expand and contract said pair of lazy tong chains, said channel guides being adjustably mounted for adjusting said rollers, and screw feed means on said channel guides for adjusting said channel guides, said guides comprising pivoted end sections pivoted on said frame for angular adjustment to adjust said rollers in response to screw feed adjustment of said guides, said guides comprising pairs, said screw feed means being operatively connected to said pairs of guides for adjusting the guides of the pairs.

References Cited in the file of this patent

UNITED STATES PATENTS

| | | |
|---|---|---|
| 1,448,689 | Hatch | Mar. 13, 1923 |
| 1,868,356 | Helenbolt | July 19, 1932 |
| 2,370,539 | Hodecker | Feb. 27, 1945 |
| 2,441,154 | Kerian | May 11, 1948 |
| 2,582,545 | Kerian | Jan. 15, 1952 |
| 2,661,840 | Ballard et al. | Dec. 8, 1953 |
| 2,714,452 | Lorence | Aug. 2, 1955 |

FOREIGN PATENTS

| | | |
|---|---|---|
| 17,755 | Australia | May 21, 1935 |
| 408,050 | Great Britain | Apr. 5, 1934 |
| 177,872 | Switzerland | June 30, 1935 |